United States Patent
Yanagisawa et al.

(10) Patent No.: US 6,965,377 B2
(45) Date of Patent: Nov. 15, 2005

(54) COORDINATE INPUT APPARATUS, COORDINATE INPUT METHOD, COORDINATE INPUT-OUTPUT APPARATUS, COORDINATE INPUT-OUTPUT UNIT, AND COORDINATE PLATE

(75) Inventors: Ryozo Yanagisawa, Shizuoka (JP); Hajime Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 387 days.

(21) Appl. No.: 09/973,838

(22) Filed: Oct. 11, 2001

(65) Prior Publication Data
US 2002/0046887 A1 Apr. 25, 2002

(30) Foreign Application Priority Data

| Oct. 19, 2000 | (JP) | 2000-319203 |
| Oct. 19, 2000 | (JP) | 2000-319204 |
| Sep. 18, 2001 | (JP) | 2001-283188 |

(51) Int. Cl.$^7$ .................................................. G09G 5/00
(52) U.S. Cl. ..................... 345/173; 345/175; 345/104; 345/177; 178/18.01
(58) Field of Search .................. 345/173, 175, 345/177, 104; 178/18.01, 18

(56) References Cited

U.S. PATENT DOCUMENTS

| 4,613,964 A | 9/1986 | Ichikawa et al. ............ 369/45 |
| 4,933,660 A | * 6/1990 | Wynne ........................ 338/114 |
| 4,980,518 A | 12/1990 | Kobayashi et al. ........... 178/18 |

(Continued)

FOREIGN PATENT DOCUMENTS

| JP | 61-262832 | 11/1986 |
| JP | 61-296421 | 12/1986 |
| JP | 61-296422 | 12/1986 |
| JP | 03-037707 | 2/1991 |
| JP | 50-53715 | 3/1993 |
| JP | 50-53717 | 3/1993 |
| JP | 50-66877 | 3/1993 |
| JP | 50-80921 | 4/1993 |
| JP | 5-289806 | 11/1993 |

Primary Examiner—Guy Lamarre
Assistant Examiner—Fritz Alphonse
(74) Attorney, Agent, or Firm—Fitzpatrick, Cella, Harper & Scinto.

(57) ABSTRACT

A coordinate input apparatus and a coordinate inputting method are provided, in which any influence on display images by coordinate information recorded on a coordinate plate can be extremely reduced and excellent operation of input indication is enabled without being disturbed by the coordinate information. A coordinate input apparatus includes a coordinate plate having plural pieces of coordinate information recorded thereon and a pen, or input-indicator, for indicating a desired position of the coordinate plate so as to detect coordinate information in the vicinity of the position and for indicating a position to be input. Coordinate values are determined from the coordinate information detected by the input-indicator so as to determine a coordinate value of the coordinate in the position to be input on the basis of the coordinate values and to input the coordinate value.

24 Claims, 9 Drawing Sheets

PEN CONFIGURATION USED IN FIRST EMBODIMENT

U.S. PATENT DOCUMENTS

| | | | |
|---|---|---|---|
| 5,017,913 A | * 5/1991 | Kaneko et al. | 345/177 |
| 5,051,736 A | * 9/1991 | Bennett et al. | 345/180 |
| 5,097,102 A | 3/1992 | Yoshimura et al. | 178/18 |
| 5,142,106 A | 8/1992 | Yoshimura et al. | 178/18 |
| 5,210,785 A | 5/1993 | Sato et al. | 379/58 |
| 5,231,394 A | 7/1993 | Sato | 341/50 |
| 5,239,138 A | 8/1993 | Kobayashi et al. | 178/18 |
| 5,392,058 A | 2/1995 | Tagawa | 345/104 |
| 5,500,492 A | 3/1996 | Kobayashi et al. | 178/18 |
| 5,517,553 A | 5/1996 | Sato | 379/59 |
| 5,539,678 A | 7/1996 | Tanaka et al. | 364/561 |
| 5,565,893 A | 10/1996 | Sato et al. | 345/177 |
| 5,621,300 A | 4/1997 | Sato et al. | 320/5 |
| 5,714,698 A | 2/1998 | Tokioka et al. | 73/865.4 |
| 5,751,133 A | 5/1998 | Sato et al. | 320/13 |
| 5,805,147 A | 9/1998 | Tokioka et al. | 345/173 |
| 5,818,429 A | * 10/1998 | Tanaka et al. | 345/173 |
| 5,831,603 A | 11/1998 | Yoshimura et al. | 345/177 |
| 5,862,049 A | * 1/1999 | Sato et al. | 700/85 |
| 5,936,207 A | 8/1999 | Kobayashi et al. | 178/18.01 |
| 6,005,200 A | * 12/1999 | Stanchak et al. | 178/19.01 |
| 6,186,405 B1 | * 2/2001 | Yoshioka | 235/494 |
| 6,548,768 B1 | 4/2003 | Pettersson et al. | 178/18.01 |
| 6,678,499 B1 | * 1/2004 | Silverbrook et al. | 434/350 |

* cited by examiner

BLOCK DIAGRAM OF ENTIRE SYSTEM IN FIRST EMBODIMENT

DOT ARRAY OF COORDINATE PLATE USED IN FIRST EMBODIMENT

FLOW CHART OF PROCESSING PROCEDURE OF FIRST EMBODIMENT

IMAGE INFORMATION TO BE READ BY AREA SENSOR IN FIRST EMBODIMANT

IMAGE INFORMATION TO BE READ BY AREA SENSOR IN FIRST EMBODIMANT

SCHEMATIC SECTIONAL VIEW OF
COORDINATE PLATE USED IN SECOND EMBODIMENT

SCHEMATIC SECTIONAL VIEW OF COORDINATE PLATE
IN MODIFIED EMBODIMENT

COORDINATE INPUT APPARATUS, COORDINATE INPUT METHOD, COORDINATE INPUT-OUTPUT APPARATUS, COORDINATE INPUT-OUTPUT UNIT, AND COORDINATE PLATE

BACKGROUND OF THE INVENTION

1. Field of the Invention

The present invention relates to a coordinate input apparatus and a coordinate input-output apparatus in which an input screen is indicated by an input indicator such as a pen and a mouse so as to detect a positional coordinate indicated by the input indicator to be output to a personal computer and the like.

2. Description of the Related Art

Various types of conventional coordinate input apparatus are known, which are classified by a detection principle based on a physical phenomenon for detecting a position of the input indicator. As are also classified in the International Patents Classification (IPC), such main types are tablets as a resistance tablet, a magnetic coupling tablet, a capacitive coupling tablet, an optical coupling tablet, and an acoustic vibration tablet. The detail description of each type is omitted because the resistance tablet is disclosed in Japanese Patent Laid-Open No. 5-53715; the magnetic coupling tablet in Japanese Patent Laid-Open No. 5-289806; the capacitive coupling tablet in Japanese Patent Laid-Open No. 5-80921; the optical coupling tablet in Japanese Patent Laid-Open No. 5-53717; and the acoustic vibration tablet in Japanese Patent Laid-Open No. 5-66877, for example.

Each type of conventional coordinate input apparatus mentioned above is provided with means for generating each kind of physical phenomenon arranged in the input screen itself or between the input indicator and a part of the input screen. That is, the input screen of the resistance tablet has a stacked structure of two or more glass plates or plastic films opposing each other and having transparent resistors; in the magnetic coupling tablet, a sensor surface positioned in the input screen or below the input screen (the bottom surface of display means laid up on the input screen, for example) has loop-coil-shaped transparent electrode patterns in the X and Y directions; the input screen of the capacitive coupling tablet has line-shaped transparent electrode patterns in the X and Y directions; in the optical coupling tablet, optical units, each having a light source and a light-receiving unit, are arranged on both sides of the upper part of the input screen so that a direct vicinity of the input screen is scanned with light; and in the acoustic vibration tablet, an acoustic wave or an elastic wave emitted from or entered to the input indicator is transmitted through the direct vicinity of the input screen or within the input screen.

Due to the means for generating each kind of physical phenomenon arranged in the input screen itself or between the input indicator and a part of the input screen, as described above, there has been a problem that the conventional coordinate input apparatus described above becomes extremely expensive when increasing the area (i.e., size) of the input screen.

That is, the resistance tablet is required to form a transparent resistor having a uniform resistivity over the entire input screen; the magnetic coupling tablet and the capacitive coupling tablet are required to have loop-coil-shaped or line-shaped transparent electrode patterns in the X and Y directions uniformly arranged at equal intervals; in the optical coupling tablet, in order to scan the direct vicinity of the input screen with light in parallel with the input surface, the optical unit fine adjustment with high accuracies and the precise positional adjustment or positioning of the lateral optical units are needed. In the acoustic vibration tablet, when an acoustic wave is transmitted in the air, the air temperature control and the precise positional adjustment or positioning of plural detection sensors are required; when an elastic wave is transmitted within the input screen, in order to maintain the transmission speed constant regardless of the transmission distance, the material of the input screen requires high uniformity.

In the coordinate input apparatuses described above, there is a so-called input-output coordinate apparatus in which the input screen is integrally laid with a display screen such as a CRT, a liquid display, or a plasma display of a personal computer, enabling the personal computer to be input by directly drawing or pointing a figure on the display screen. When the conventional coordinate input apparatus is formed as an input-output integrated type, problems are as follows.

That is, in the resistance tablet, the brightness and clearness of display images are reduced because of the insufficient light-transmission rate of the resistor such as an ITO forming the transparent resistor; in the magnetic coupling tablet and the capacitive coupling tablet, the loop-coil-shaped or line-shaped transparent electrode patterns arranged in the X and Y directions are liable to be electrically and magnetically affected by noises from a panel, a driving circuit, or a power supply circuit of the display apparatus, resulting in unstable detection or further increased cost due to the unstableness prevention.

In the optical coupling tablet and the acoustic vibration tablet, a space is necessary for arranging the optical units or the detection sensors in the input screen, so that the entire apparatus shape needs to be harmonized.

Also, in the optical coupling tablet and the acoustic vibration tablet, there is an operational problem that when a hand of an operator or another article is placed into the transmission path of light, an acoustic wave, or an elastic wave, the detection performance is deteriorated or the detection cannot be established due to this effect.

As means for improving or avoiding the problems mentioned above proposed is a coordinate input apparatus comprising a coordinate plate having coded coordinate information recorded thereon and an input indicator having detecting means for detecting the coordinate information built therein.

For example, Japanese Patent Laid-Open No. 61-262832 assigned to the same assignee of this application discloses that square regions, each having at least nine divisions arranged in a matrix arrangement so as to draw a different pattern corresponding to a coordinate point on a coordinate plate, are further arranged in a matrix arrangement and are read by a coordinate indicator having a light-emission element and a light-receiving sensor built therein so that the direction and distance of the relative movement are detected depending on the changes in the pattern.

Also, Japanese Patent Laid-Open No. 61-296421 assigned to the same assignee of this application discloses that a different information corresponding to a coordinate point is positioned in each division distinguished on a coordinate plate in a matrix arrangement and is detected by a coordinate indicator so as to identify an absolute coordinate position. Japanese Patent Laid-Open No. 61-296422 assigned to the same assignee of this application also discloses that at least two kinds of information are positioned on a coordinate plate so that the amount of information is continuously changed in the direction different from each other and is detected by a coordinate indicator so as to identify an absolute coordinate position. Japanese Patent Publication No. 5-80010 discloses that from an optical stylus comprising a light source and picking up means, a passive-locator tablet having a tablet-address-cell (TAC) comprising an X-Y coordinates pair coded into a digital form and being dispersed on plural surfaces so as to be recorded forever, means for defining a TAC boundary by a spiral search, and means for periodically sampling TAC data, a pair of perfect TAC data (an X-Y coordinates pair) from TAC data sampled by Bresenham's search are produced, so that data producing means having a video memory for memorizing video images and a code-dot-image having a memory and stylus optical system subdivision stored therein produce the width of plural pixels in both directions. The Publication also discloses that the passive-locator tablet can be assembled in the front of the display surface, and that the tablet is formed from a plastic and the TAC is formed in the display side, i.e., the backside of the tablet while a glass layer is pasted in the front.

However, in the conventional coordinate input apparatus described above and comprising the coordinate plate having coded coordinate information stored therein and the input indicator having means for detecting the coordinate information built therein, two problems arise as follows. The first problem is about the reliability of the recorded coordinate information concerning the basic function of the coordinate input apparatus.

That is, in the recorded coordinate information, it is necessary that essential conditions concerning the detection by the detecting means such as the shape and clearness be semi-permanently maintained. When the recorded coordinate information is damaged, deformed, worn out, paled, discolored, and dropped off, it is extremely difficult to maintain the precise detection. Furthermore, the basic function of the coordinate input apparatus is damaged causing miss-detection or non-detectability. For example, it is obvious that the input indicating means be abutted, pressed, or rubbed against the surface of the coordinate plate or the tablet by an operator during the operation, so that when the surface of the coordinate plate or the tablet is provided with the coordinate information recorded thereon, the apparatus becomes extremely expensive in order to endure the actions described above for a long period.

When the back surface of the coordinate plate or the tablet is provided with the coordinate information recorded thereon, extremely careful handling is necessary to avoid damaging, paling, discoloring, and dropping off the coordinate information in the effective input region which dominates most of a plate member during the various manufacturing processes such as assembling, storing, and transportation after recording the coordinate information. This results in an extremely expensive apparatus. Moreover, when the back surface of the coordinate plate or the tablet is provided with the coordinate information recorded thereon, in order to use the tablet as a single unit on a desk, etc., it is necessary to endure the contact, abutment, and friction with various articles on the desk, resulting in an extremely expensive apparatus.

The second problem is that when the apparatus is formed as an input-output integrated type by laying the coordinate plate or the tablet with the display apparatus, as described above, due to the coordinate information recorded on the coordinate plate or the tablet, the brightness (luminance) of display images is reduced, the clearness (resolution) of display images is reduced, the reflection of extraneous light is increased, and the operability of input indication is reduced by being disturbed by the coordinate information when an operator can recognize it.

As for the problems described above, in Japanese Patent Laid-Open No. 61-262832, Japanese Patent Laid-Open No. 61-296421, and Japanese Patent Laid-Open No. 61-296422, the reliability of the coordinate information described above is not suggested, so that the first problem cannot be avoided by these disclosures.

Also, in these three disclosures, although the coordinate information positioned in the coordinate plate is suggested, the input-output integrated type with the display apparatus and the effect of the coordinate information on the display images are not suggested, so that the second problem cannot be avoided by these disclosures.

In Japanese Patent Publication No. 5-80010, although it is disclosed that as a structure having the excellent resistance to wear, the tablet is formed from a plastic and the TAC is formed in the backside of the tablet while a glass layer is pasted in the front, the problem in the manufacturing processes as the first problem and the problem in using the tablet as a single unit are not suggested so that the first problem cannot be sufficiently avoided by the disclosure.

Also, in Japanese Patent Publication No. 5-80010, it is suggested that in the input-output integrated type with the display apparatus, it is preferable that a gray grade caused by the TAC be uniform over the entire tablet, and binary codes for that reason; however, none of the method and means for reducing the gray grade which largely affects the display images is suggested. That is, there is a problem that the gray grade caused by the TAC affects the clearness of display images. As for this problem, according to the embodiment of Japanese Patent Publication No. 5-80010, if the tablet is 1 m×1 m in size; one dot of a corner cube indicating "1" is φ24 μm; the TAC is 7×7 dots, i.e., 250×250 μm in size, when in order to unify the gray grade in one TAC, 25 corner cubes are formed, the area ratio of the corner cubes in the entire tablet area is approximately 20%, resulting in the largely inverse effect on the clearness of the display images. As is suggested in the embodiment, the degree of freedom of the TAC format is maintained within the range of recognizing X and Y coordinates; however, it is for the degree of freedom of high-density code-data format which is one of the objects of Japanese Patent Publication No. 5-80010, so that the second problem is not suggested.

SUMMARY OF THE INVENTION

The present invention has been made in view of these situations, so that it is an object of the present invention to provide a coordinate input apparatus and a coordinate input-output apparatus with excellent reliability and operability and low cost. That is, the reliability of the recorded coordinate information is high, while eliminating reduction in the brightness (luminance) of display images, reduction in the clearness (resolution) of display images, increasing in the reflection of extraneous light, and reduction in the operability of input indication by being disturbed by the coordinate information when an operator can recognize it.

The present invention has been made in view of the problems described above, and an object of the present invention is to provide a coordinate input apparatus which comprises a coordinate plate having plural pieces of coordinate information each corresponding to an X-coordinate value and plural pieces of coordinate information each corresponding to a Y-coordinate value. The plural pieces of coordinate information are independently and intermittently recorded on the coordinate plate. In addition, input-indicating means indicate a position of the coordinate plate to be input and detect coordinate information in the vicinity of the position, and processing means determine X-coordinate values and Y-coordinate values from the coordinate information detected by the input-indicating means and determine the coordinate of the input position on the basis of the X-coordinate values and Y-coordinate values.

The present invention has been made in view of the problems described above, and another object of the present invention is to provide a method of inputting a coordinate into a coordinate input apparatus having a coordinate plate with plural pieces of X-coordinate information and plural pieces of Y-coordinate information recorded thereon and input-indicating means for indicating a position to be input. The method comprises a reading step of reading image information from the coordinate plate by the input-indicating means, a first extracting step of extracting first coordinate information from the image information read in the reading step, a first determining step of determining coordinate values in the X- or Y-axis in the first coordinate information using the first coordinate information extracted in the first extracting step, and a second extracting step of extracting second coordinate information using the image information read in the reading step. Additional steps include a second determining step of determining coordinate values in the X- or Y-axis in the second coordinate information using the second coordinate information extracted in the second extracting step, a third determining step of determining coordinate values of the input position indicated by the input-indicating means in the X- and Y-axes on the basis of the coordinate values in the first coordinate information determined in the first determining step and the coordinate values in the second coordinate information determined in the second determined step, and an inputting step of inputting the coordinate values in the X- and Y-axes determined in the third determining step.

The present invention has been made in view of the problems described above, and another object of the present invention is to provide a method of inputting a coordinate into a coordinate input apparatus having a coordinate plate with plural pieces of X-coordinate information and plural pieces of Y-coordinate information recorded thereon and input-indicating means for indicating a position to be input. The method comprises a reading step of reading image information from the coordinate plate by the input-indicating means, a first extracting step of extracting first coordinate information located in a central region of the image information read in the reading step, a first determining step of determining coordinate values in the X- or Y-axis in the first coordinate information from the first coordinate information extracted in the first extracting step, and an estimating step of estimating the position of second coordinate information so as to be extracted from the first coordinate information extracted in the first extracting step. Additional steps include a second determining step of determining coordinate values in the X- or Y-axis in the second coordinate information using the second coordinate information extracted in the estimating step, a third determining step of determining coordinate values of the position to be input indicated by the input-indicating means in the X- and Y-axes on the basis of the coordinate values in the first coordinate information determined in the first determining step and the coordinate values in the second coordinate information determined in the second determining step, and an inputting step of inputting the coordinate values in the X- and Y-axes determined in the third determining step.

The present invention has been made in view of the problems described above, and another object of the present invention is to provide a coordinate input apparatus which comprises a coordinate plate having plural pieces of coordinate information recorded thereon which correspond to X-coordinate values and/or Y-coordinate values in a coordinate input effective region forming an X-Y coordinate plane, and input-indicating means comprising means for detecting the coordinate information of the coordinate plate. The coordinate plate has a layered structure comprising a plurality of layers deposited in the thickness direction, and the coordinate information is stored between the layers of the layered structure.

The present invention has been made in view of the problems described above, and another object of the present invention is to provide a coordinate input-output apparatus which comprises displaying means capable of displaying two-dimensional images, a coordinate plate having a plurality of pieces of coordinate information recorded thereon which correspond to X-coordinate values and/or Y-coordinate values in a coordinate input effective region forming an X-Y coordinate plane, and input-indicating means comprising means for detecting the coordinate information of the coordinate plate. A surface of the coordinate plate having the coordinate information recorded thereon opposes and is bonded to a surface of the displaying means.

The present invention has been made in view of the problems described above, and another object of the present invention is to provide a coordinate input apparatus which comprises a coordinate plate having plural pieces of coordinate information recorded thereon, input-indicating means for indicating a position to be input of the coordinate plate and for detecting coordinate information in the vicinity of the position, and processing means for determining the coordinate of the position indicated by the input-indicating means from coordinate values in the coordinate information detected by the input-indicating means.

The present invention has been made in view of the problems described above, and another object of the present invention is to provide a coordinate input-output unit of a coordinate input apparatus in which a coordinate plate having coordinate information recorded thereon and a display apparatus are integrated together, in the coordinate input-output unit, the coordinate information being recorded on the coordinate plate to be positionally related to a plurality of display pixels forming display images of the display apparatus.

The present invention has been made in view of the problems described above, and another object of the present invention is to provide a coordinate plate of a coordinate input apparatus which comprises plural pieces of coordinate information corresponding to X-coordinate values and plural pieces of coordinate information corresponding to Y-coordinate values, the respective plural pieces of coordinate information being independently and intermittently recorded thereon.

Further objects, features and advantages of the present invention will become apparent from the following description of the preferred embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will now be described in detail in accordance with an embodiment of a coordinate input-output apparatus with reference to the accompanying drawings. In addition, the present invention is not limited to the coordinate input-output apparatus; however, it can be applied to a coordinate input apparatus by being supported by the embodiment.

First Embodiment

Figure 1:
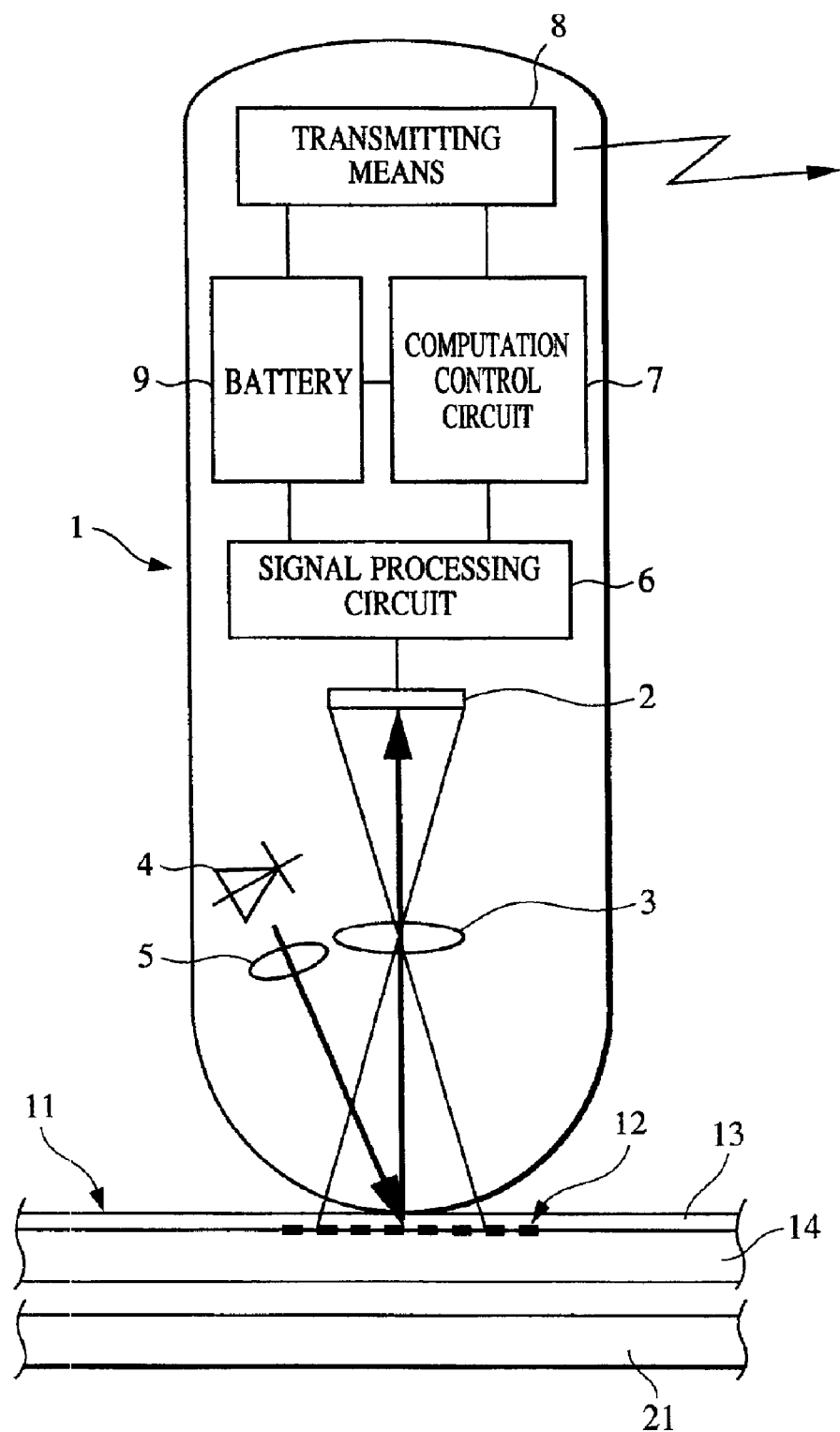
FIG. 1 is a drawing showing a pen for use in a first embodiment.
Figure 2:
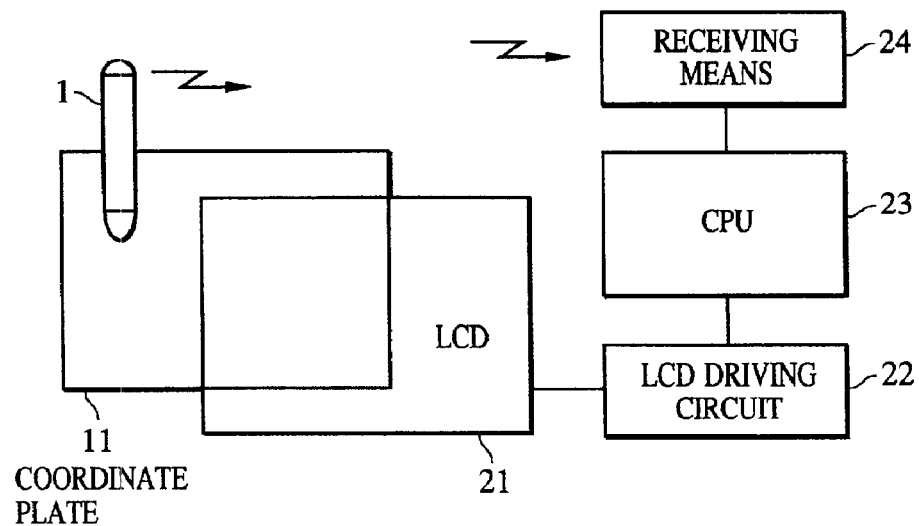
FIG. 2 is a block diagram showing a system configuration of the entire first embodiment.

FIG. 1 is a block diagram showing an input indicator (a pen 1) for use in a coordinate input-output apparatus according to a first embodiment; FIG. 2 is a block diagram showing a system configuration of the entire coordinate input-output apparatus according to the first embodiment.

First, the entire system configuration will be described. In FIG. 2, an input-output integrated type liquid crystal display (LCD) 21, having a coordinate plate 11 having coded coordinate information recorded thereon laid at the front face, displays desired images by an LCD driving circuit 22 based on the indication from a CPU 23. The pen 1 detects the coordinate information so as to transmit coordinate data to receiving means 24 connected to the CPU 23. The CPU 23 carries out predetermined processing based on the result received by the receiving means 24. In the processing, a menu of commands of a position corresponding to the coordinate data of a point input by the pen 1 is executed, for example. A point corresponding to the position of the pen 1 can also be displayed on the LCD 21 by the LCD driving circuit 22. When the input by the pen 1 is continuously performed, a trajectory of the movement of the pen 1 can be displayed on the LCD 21 by connecting input points detected in a predetermined sampling grade by straight line. Furthermore, by recognizing and determining the trajectory, the recognition of a character or a figure and the execution of gesture commands can be performed. Also, by turning on a switch (not shown) provided in the pen 1 equivalent to a mouse button so as to transmit and receive the ON information together with the coordinate information, the selection or execution of a menu commands or an icon, which are indicated by the pen 1, can be performed. In this case, various application software can be operated by the pen 1.

Next, the configuration of the pen 1 will be described. In FIG. 1, a sensor 2 is an area sensor such as a CCD area (two-dimensional) sensor or a CMOS area sensor and is formed to read the surface vicinity of the coordinate plate 11 via an objective lens 3. The area sensor 2 and the objective lens 3 are configured so that a region to be read by the area sensor 2 certainly includes at least one of a dot array 12 indicating an X-coordinate value or a Y-coordinate value which will be mentioned later. As will be described later, when the dot array 12 having an X-coordinate value coded thereon and the dot array 12 having a Y-coordinate value coded thereon are arrayed alternately at substantially the same pitch as that of a display pixel on the LCD 21, the region has a size larger than that of 2×2 pixels of the display pixel on the LCD 21.

In the embodiment, the region to be read by the area sensor 2 is 2.5×2.5 pixels of the LCD 21 in size. The area sensor 2 and the objective lens 3 are configured so that plural pixels of the area sensor 2 correspond to one dot forming the dot array 12 which will be described later. In the embodiment, 3×3=9 pixels of the area sensor 2 correspond to one dot.

A light-emitting element 4 irradiates the coordinate plate 11 using an LED and a semiconductor laser element, for example. A collimator lens 5 for making the irradiated light parallel beams may be provided on demand. In order to improve availability of the light-emitting element 4, beam-condensing means such as a reflecting mirror may be used.

A signal processing circuit 6 binarizes the output of the area sensor 2 every one pixel of the area sensor 2 so as to output it to a computation control circuit 7 as digital image information. When coordinate information recorded on the coordinate plate 11, which will be described later, is formed by a dot array, the binarization is performed to be information "1" in the presence of a dot and to be information "0" in the absence of a dot or in the background. In the binarization, when the pen 1 is located in the boundary between a white image and a black image according to contents of display images of the LCD 21, for example, the output level may be largely changed every one pixel in the area sensor 2 by being influenced by the display images in the rear of the coordinate plate 11 viewed from the area sensor 2, so that fixed threshold processing for the binarization may not be performed. In such a case, a so-called known automatic gain control (AGC) is used, in which an amplifying rate of the sensor output is changed by output levels of plural pixels. Also, dynamic threshold processing known in an image processing technique such as a method of moving averages may be used, in which the binarization is performed by comparison between the output of an arbitrary pixel of the area sensor 2 and a local average value of the outputs of plural pixels in the vicinity of the arbitrary pixel. The dynamic threshold processing is carried out by the computation control circuit 7 on demand.

The binarized digital information is transmitted to and stored in the computation control circuit 7 comprising a microcomputer, a ROM having control procedure or a correspondence table between coordinate information and a coordinate value stored therein, and a RAM having the digital image information stored therein. In the computation control circuit 7, the extraction of a first and a second dot array in the vicinity of the center, which will be described later, the distinguishing between the X-coordinate and the Y-coordinate of the extracted dot array, the determination of each coordinate value and directions of X- and Y-axes, and the calculation of the distance from each dot array center are performed so as to determine the coordinate value of the pen 1. The determined coordinate value is sent to transmitting means 8 which transmits it in turn to a receiving means 24 in predetermined communication format by using infrared rays or radio waves.

In addition, the pen 1 has the area sensor 2, the light-emitting element 4, the signal processing circuit 6, the computation control circuit 7, and a battery 9 which is a power source for driving the transmitting circuit 8, etc., built therein. The pen 1 is also provided with a pen-point switch (not shown). The pen-point switch is turned on when the pen 1 is abutted to the coordinate plate 11 and a pen point is slid at a predetermined distance along the pen axis in the rear direction of the pen 1. Only when the pen point abuts the coordinate plate 11, i.e., the pen-point switch is turned on, the driving of the units mentioned above, the reading of coordinate information, the determination of the coordinate value, and the transmission are performed at predetermined time intervals, i.e., at a predetermined sampling rate. Thereby, an extremely long life of the battery can be achieved. Furthermore, ON/OFF states of the pen-point switch may be transmitted to the CPU by the transmitting means 8 together with the coordinate value.

Next, the structure of the coordinate plate 11 will be described. In the embodiment, as shown in FIG. 1, the coordinate plate 11 is arranged at the front face of the LCD 21 having a predetermined gap to the LCD 21. The coordinate plate 11 has a layered structure in which on the entire surface of a transparent glass plate 14 pasted is a transparent film 13 formed of a plastic such as polyethylene terephthalate (PET), polycarbonate (PC), or an acrylic resin. The film 13 and the glass plate 14 are bonded together with a transparent adhesive such as an acrylic group or a double-faced tape. On the bonding surface of the film 13, a matrix dot array 12, which will be described later, is intermittently formed at predetermined pitches over the entire effective input region. The effective input region is set to have a size larger than that of the display region of the LCD 21 by a predetermined size so that the entire display region of the LCD 21 can be input by the pen 1.

The dot array 12 is formed on the film 13 by using a known technique such as printing or a printer technique. That is, the dot array 12 is formed by fine printing such as photolithography or by the printer technique in which ink is ejected from a fine nozzle.

In the dot array 12, information in the presence of a dot is "1" and information in the absence of a dot, i.e., on the surface of the transparent coordinate plate 11 having the display surface of the LCD 21 disposed in the rear of the coordinate plate 11 as a background, is "0". The display surface of the LCD 21 is configured to be located out of the depth field of the objective lens 3 so that in the image read by the area sensor 2, the image is blurred in the absence of a dot and in the background so as to obtain an appropriate contrast to the place in the presence of a dot. Also, the color of the dot array 12 is not necessarily limited to a specific color. However, because the effect by the presence of the dot array 12 on the display images of the LCD 21 cannot become zero, a more non-conspicuous color such as gray is preferable within a range allowable for the contrast.

The surface of the film 13 having the dot array 12 formed thereon is bonded on the glass plate 14 with a transparent adhesive, etc. By this structure, even when an operator indicates or moves and scans the surface of the coordinate plate 11 for inputting, the dot array 12 cannot touch the pen 1 directly, thereby eliminating damages and dropping off in the dot array 12 so as to hold the dot array 12 forever with extremely high reliability.

On the surface of the coordinate plate 11, that is, the surface of the film 13 and the rear surface of the glass plate 14, anti-reflection processing for reducing the light-reflectance factor and non-glare processing for diffusing light are performed on demand so that an operator can view display images comfortably. Also, in order to prevent the surface of the film 13 from being damaged, so-called hard coating is carried out using a hardened film such as an acrylic film or a silicone film.

Figure 3:
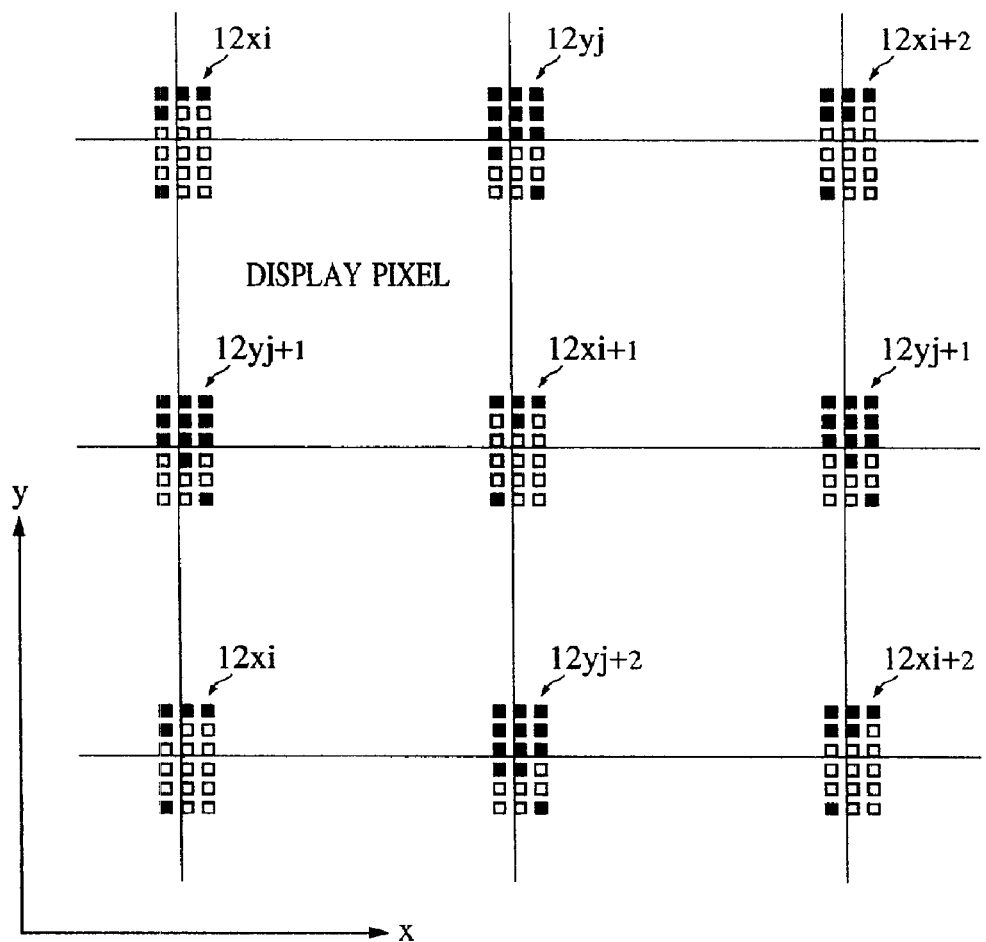
FIG. 3 is a drawing showing a dot array of a coordinate plate for use in the first embodiment.

Next, the dot array 12 will be described in more detail. FIG. 3 shows an exploded view of an extremely small part of the input effective region. A region defined by fine lines arranged in parallel crosses corresponds to one display pixel of the LCD 21. The dot array $12Xi$, $12Xi+1$, and $12Xi+2$ having X-coordinate values of the input effective region coded thereon and the dot array $12Yj$, $12Yj+1$, and $12Yj+2$ having Y-coordinate values of the input effective region coded thereon are alternately arranged at substantially the same pitches as those of the display pixels. When the display pixel is a square and the dot array 12 is formed so that the lateral direction of the display face is the X-axis and the vertical direction is the Y-axis, the dot array 12 is formed at the same pitches in both X- and Y-axis directions. Likewise, over the entire input effective region, the dot array $12Xl$ and $12Xm$ having X-coordinate values of the input effective region coded thereon and the dot array $12Yl$ and $12Yn$ having Y-coordinate values of the input effective region coded thereon are alternately arranged, of course.

The dot array 12 is a matrix with 6 rows and 3 columns, and one of the dot array 12 is formed of 18 dots. FIG. 3 schematically shows that "1", which shows a dot is present, is denoted by the black dot while "0", which shows a dot is absent, is denoted by the white dot enclosed with a frame. It is of course that only the dots exist in fact (see FIG. 5, for example). It is preferable that the dot have a scarcely recognizable size by an operator, that is, a circle or a polygon with several tens $\mu$m in diameter, or in side. Also, between dots, there is a gap having substantially the same size as that of the dot. This gap prevents the reduction in operability, that is, an operator can recognize the dot to be disturbed when "1" continues in succession without gaps.

In the 18 dots, 3 dots in the lowest sixth row are used for determining the X- or Y-coordinate. That is, in FIG. 3, from the left, "1, 0, 0", indicates the X-coordinate, while "0, 0, 1" indicates the Y-coordinate. Also, 3 dots in the top first row are "1, 1, 1" in the all dot array 12. Thereby, the direction of the matrix is determined regardless the rotational direction of the pen 1, i.e., the direction of the area sensor 2 on the plane of the coordinate plate 11, so that the directions of X- and Y-axes (positive or negative direction) can be unconditionally determined. Then, by 12 dots in the second to the fifth row, the X- and Y-coordinate values are coded. In the embodiment, from the existence of 12 dots, coordinate values of 4096 different combinations can be represented. It is of course that these do not depend on the direction of the area sensor and the pixel arrangement be known.

Figure 4:
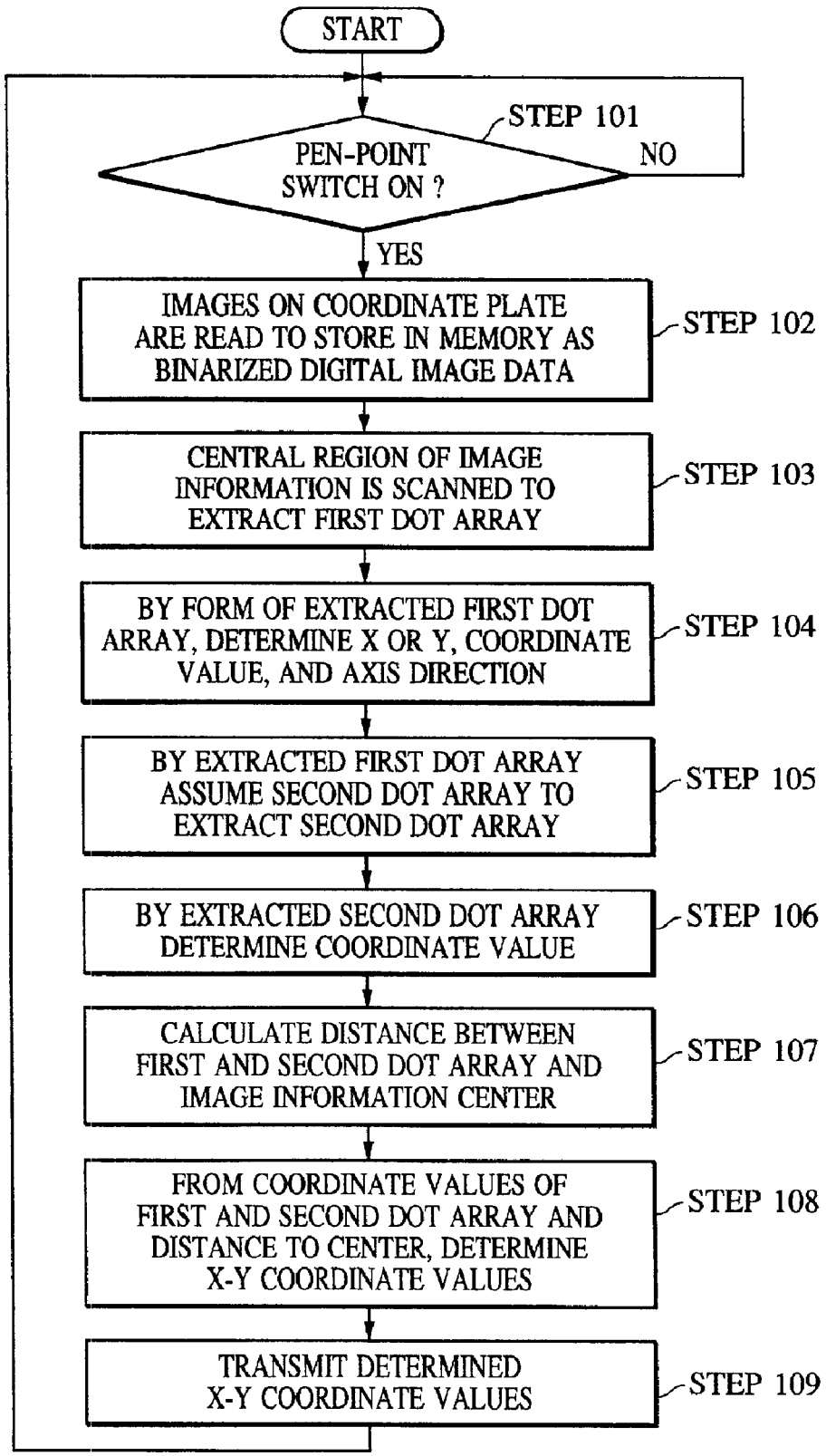
FIG. 4 is a flow-chart showing the processing procedure in the first embodiment.

In the structure described above, the operation will be described with reference to the flow-chart in FIG. 4 and image information read by the area sensor 2 in FIGS. 5 and 6.

First, in Step 101, ON/OFF of the pen-point switch is determined. That is, when the pen 1 is abutted to the coordinate plate 11 and the pen-point switch is ON, it is under input operation and proceeds to Step 102.

Figure 5:
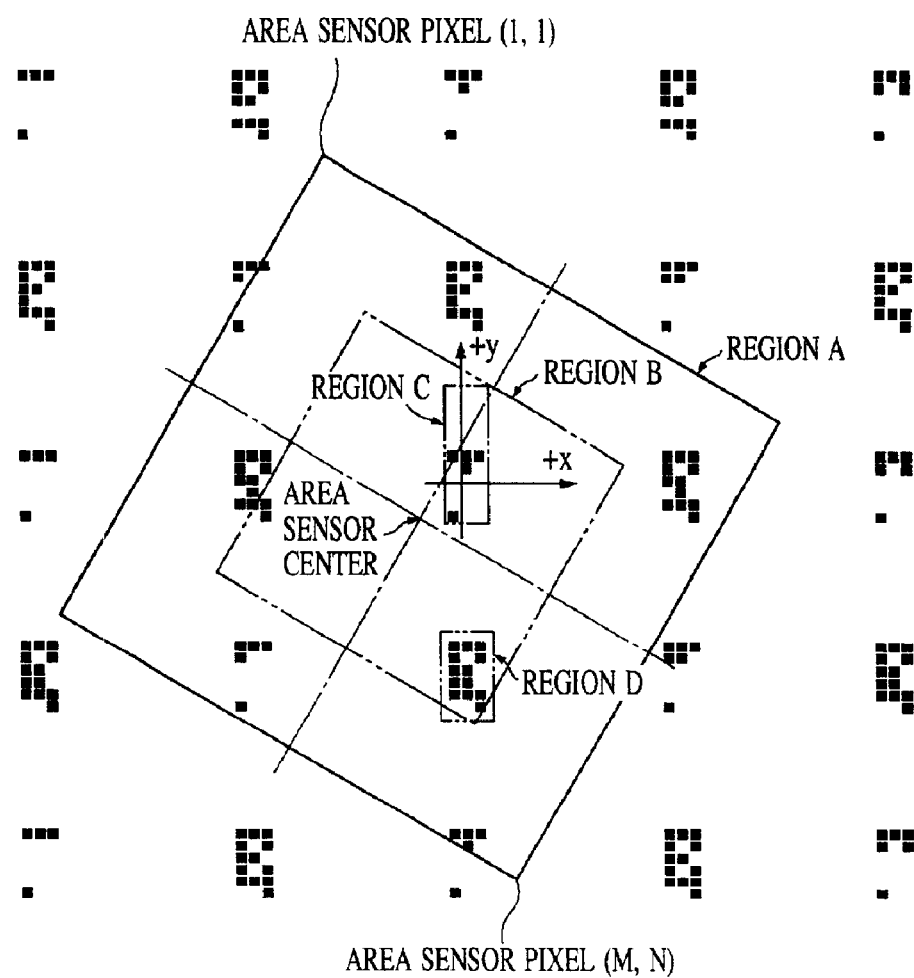
FIG. 5 is a drawing showing image information to be read by an area sensor in the first embodiment.
Figure 6:
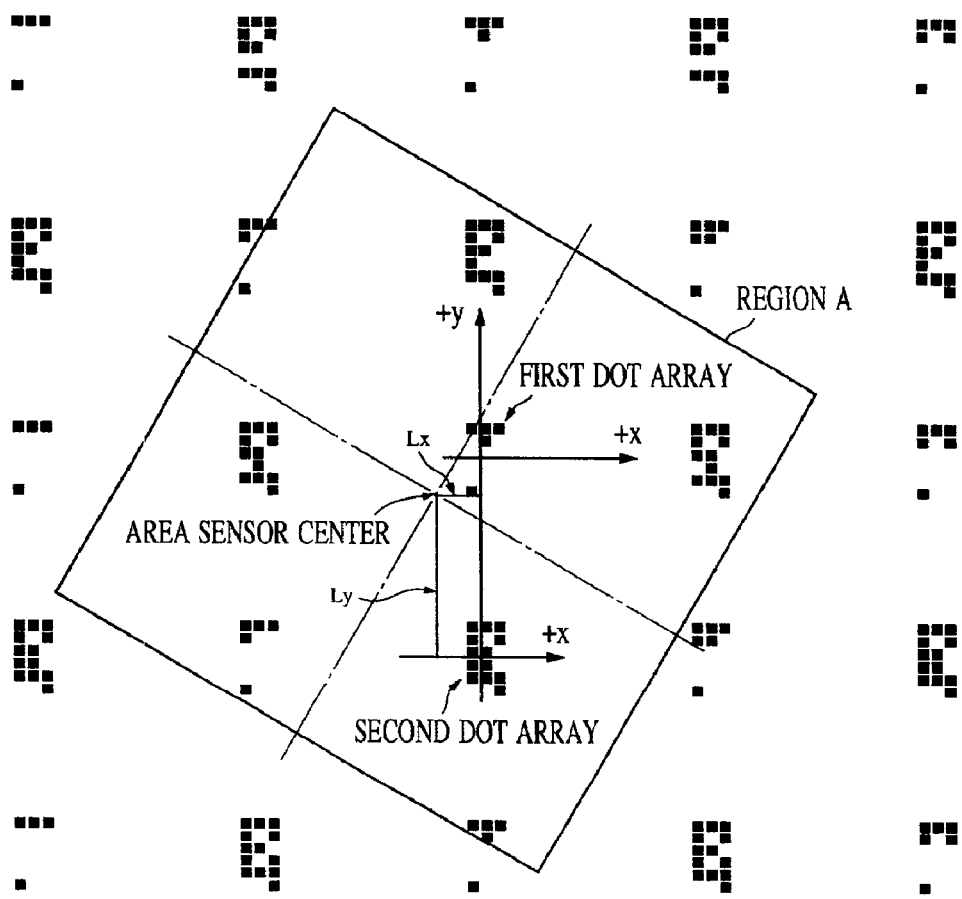
FIG. 6 is a drawing showing image information to be read by an area sensor in the first embodiment.

In Step 102, the light-emitting element 4 irradiates the vicinity of the pen point, so that the area sensor 2 reads images of the region A including plural numbers of the dot array 12 in the vicinity of the pen point on the coordinate plate 11 (FIG. 5). In the region A, there exists at least one of the dot array 12 representing X- and Y-coordinate values. The read images are output by the area sensor 2 to the signal processing circuit 6 where the binarization is performed every one pixel so as to be stored as digital image information in the RAM in the computation control circuit 7.

Next, in Step 103, for the image information stored in the computation control circuit 7, the extraction processing of a first dot array 12 disposed close to the center of the area sensor 2 is performed. The extraction processing is firstly performed by searching the region in that approximately 3×3=9 pixels are arranged in the presence of the dot, i.e., "1", while in the arbitrary direction, 3 of 3×3 pixels for "1" are arranged at the pixel pitches, that is, 3 dots in the first row of the dot array 12. As shown in FIG. 5, for example, the searching is performed in a region B of image information having an area larger by a predetermined area than that of a square having one side corresponding to the length of the diagonal of the display pixel of the LCD 21 in the vicinity of the image information center. The region B has an area corresponding to approximately ⅓ of the entire image information in the central portion. In the searching, it is of course to proceed to the next step after the 3 dots are searched. As described above, the dot array 12 is arranged at the same pitches as those of the display pixels of the LCD 21, and because the region A to be read by the area sensor 2 includes 2.5×2.5 display pixels of the LCD 21, the region B certainly includes at least one of the dot array 12. However, the 3 dots searched in the searching described above are not necessarily 3 dots in the first row, so that then, a region C having an area corresponding to two of the dot arrays 12 is scanned about the 3 dots as the center in the perpendicular direction to the line connecting the searched 3 dots so as to extract the first dot array 12.

Next, in Step 104, the directions of X- and Y-axes, which are set in the coordinate plate 11 in advance in the stored image information, are determined from the direction of the first dot array 12. In the determination, as shown in FIG. 3, for example, when the matrix with 6 rows and 3 columns is viewed as a principal position and the right direction is set to be the positive direction of the X-axis while the upper direction is set to be the positive direction of the Y-axis, the positive directions of the X- and Y-axes are determined from the positive direction of the first dot array 12 (see FIG. 5). Then, from the code arrangement of 3 dots in the sixth row of the first dot array 12, the first dot array 12 is determined whether the coordinate information having an X-coordinate value coded thereon or the coordinate information having a Y-coordinate value coded thereon. Then, from the code arrangement of 12 dots in the second to the fifth row of the first dot array 12, the coded coordinate value of the X- or Y-axis is determined. In the determination, a reference table and the like may be used on demand.

Next, in Step 105, from the position of the first dot array 12 in the image information and the positive directions of X- and Y-axes, the position in the image information of the second dot array 12 to be extracted is estimated so as to extract it. In the estimation and extraction in the embodiment, for example, 4 pieces of the coordinate information of the Y-coordinate values approaching the coordinate information of the X-coordinate values exist in the ± directions of the X- or Y-axis spaced by one display pixel. Therefore, from the position of the first dot array 12 in the image information and the positive directions of X- and Y-axes, one piece in the 4 pieces being closer to the center of the image information is estimated to be the second dot array 12 to be extracted; the position thereof is estimated and the second dot array 12 can be extracted by scanning image information in a predetermined region D having an area larger than that of the dot array 12 (see FIG. 5).

Then, in Step 106, from the code arrangement of 12 dots in the second to the fifth row of the extracted second dot array 12, the coded coordinate value having an axis different from the first dot array 12 is determined.

Next, in Step 107, the distance between the first dot array 12, the second dot array 12, and the center of image information is calculated. The distance is a length between the X- or the Y-axis corresponding to X- or Y-coordinate value represented by the first dot array 12 or the second dot array 12 and the center of image information. The position of the coordinate value represented by the dot array 12 can be located in a desired position in the dot array 12. In the embodiment, when the dot array 12 is viewed as a principal position, a position of the coordinate value represented by the dot array 12 is set to be the lower left end of the dot in the third row and the second column and the coordinate value is coded by corresponding to the position. Then, distances Lx and Ly between the center of image information and X- and Y-axes passing the position are calculated (see FIG. 6). The distance is of course converted to the value of the coordinate axis on the coordinate plate 11.

Then, in Step 108, from the coordinate values of the first dot array 12 and the second dot array 12 and the distances Lx and Ly between the respective coordinate axes of the first dot array 12 and the second dot array 12 and the center of image information, i.e., the center of the pen 1, the precise positional coordinate of the pen 1 can be calculated. In the calculation, positive and negative directions of X- and Y-axes are certainly considered in the distances Lx and Ly to the center. By the calculation, even when the pen 1 is moved at a very small distance and the extracted dot array is not changed, the distance between the dot array 12 and the center of image information is differently calculated, so that the very small movement can be detected, thereby enabling coordinate inputting to be performed with extremely high resolution power. Moreover, the same high accuracies can be maintained over the entire input effective region.

Next, in Step 109, the calculated X- and Y-coordinate values are sent to the transmitting means 8 from the computation control circuit 7, which in turn are input in the CPU 23 via the receiving means 24.

In addition, prior to the processing described above, known processing may be performed, in which the coordinate of the coordinate plate 11 is set adjust to the coordinate of the LCD 21; or in order to correct the detected coordinate values, the plural desired points are displayed on the display images so that the pen 1 is placed to the points to be input.

As shown in the structure and operation described above, in the embodiment, because the dot array 12 is not formed on the film surface 13 but on the laminating surface, when an operator indicates or scans the surface of the coordinate plate 11 with the pen 1, the pen 1 cannot touch the dot array 12 directly, so that the dot array 12 can be maintained forever with extremely high reliability and without damages, deformation, wearing out, paling, discoloring, and dropping off. Also, in the manufacturing process of the coordinate plate 11, once the film 13 is bonded on the glass plate 14, the handling is easy without specific caution or jigs.

In the embodiment, because the information including in the dot array 12 that is coded coordinate information is not a pair of X- and Y-coordinate values but is one of the pair, the amount of information of one piece of the coordinate information can be halved. Furthermore, by arranging large gaps between adjacent dot array 12 so as to intermittently record the information, the number of pieces of information can be extremely reduced. For example, in the coordinate plate 11 having an input effective region of 1 m×1 m, when the arrangement pitch of the matrix with 6 rows and 3 columns of the dot array 12 is 1 mm for both X- and Y-axes, and the dot of the dot array 12 is ϕ30 μm in size, the sum of the area dominated by dots is approximately 0.7% of the entire input effective area. Therefore, even when the coordinate plate 11 is laid to the LCD 21 together as an input-output integrated type, the dot array 12 that is coordinate information recorded on the coordinate plate 11 scarcely has any influence on the display images.

This advantage is due to using only 6 dots in total including the first and the sixth row of the matrix with 6 rows and 3 columns of the dot array 12 in order to recognize the directions of X- and Y-axes, and X- and Y-coordinate values.

The arrangement of the dot array 12 has gaps between dots, so that an operator cannot recognize the dot because the dot does not continue in succession, enabling excellent input indicating operation to be performed without being disturbed by the dots.

In the structure described above, the arrangement pitch of the dot array 12 is 1 mm, which is the same as that of display pixels, and the dot of the dot array 12 is ϕ30 μm in size. When the region to be read by the area sensor 2 is 2.5×2.5 display pixels, as described above, and the 3×3 pixels of the area sensor 2 correspond to one dot, the number of pixels of the area sensor 2 is 250×250 which is approximately 60 thousands pixels in total. The area sensor 2 with this number of pixels can be readily achieved at low cost using any type of CCD and CMOS, and the computation control circuit 7 and the signal processing circuit 6 can be readily achieved by existing technologies, so that the coordinate input-output apparatus according to the embodiment can be achieved with appropriate cost-effectiveness.

As described above, according to the embodiment, the coordinate plate has a layered structure comprising plural layers in the thickness direction and coordinate information is stored between the layers of the layered structure. With this arrangement, even when the pen, which is input indicating means, is abutted, pressed, or rubbed against the surface of the coordinate plate by an operator during the operation, because the input indicating means or other articles cannot touch the coordinate information directly, miss-detection or non-detectability by damages, deformation, wearing out, paling, discoloring, and dropping off of the recorded coordinate information can be avoided, enabling an inexpensive apparatus with high reliability to be achieved. Also, in various manufacturing processes, extremely careful handling for avoiding damages, paling, discoloring, and dropping off of the coordinate information is not required so as to achieve an inexpensive apparatus. Moreover, in the case of the tablet with the layered structure, when it is used as a single unit on a desk, a reliable apparatus being endurable to contact, abutment, and friction against the desk surface or various articles on the desk can be achieved at extremely low cost. That is, according to the embodiment, an extremely reliable apparatus can be achieved at low cost.

The coordinate plate is formed so that the coordinate information, which is recognizable X- and Y-coordinate values, is independently and intermittently recorded thereon, because coordinate information is not a pair of X- and Y-coordinate values but is one of the pair, the amount of information of one piece of the coordinate information can be halved. Also, by recording information intermittently, the number of pieces of information can be extremely reduced, so that even when the coordinate input apparatus is formed together with the display apparatus as an input-output integrated type, the coordinate information recorded on the coordinate plate scarcely has any influence on the display images, improving operability.

The coordinate information is recorded on the coordinate plate so as to be positionally related to plural display pixels forming display images of the displaying means, so that the coordinate information recorded on the coordinate plate can be arranged in positions to have as little influence on the display images as possible, reducing influence on the display images to an extremely small extent and improving operability.

Second Embodiment

A coordinate input-output apparatus according to a second embodiment will be described with reference to FIGS. 7 and 8. The structure and operation of the pen 1, which is the input indicator, are the same as those in the first embodiment, so that description thereof is omitted. Like reference characters designate like portions having functions common to those of the first and second embodiments. In the embodiment, because of the difference from the first embodiment in the structures of the coordinate plate and the dot array, these points will be mainly described.

Figure 7:
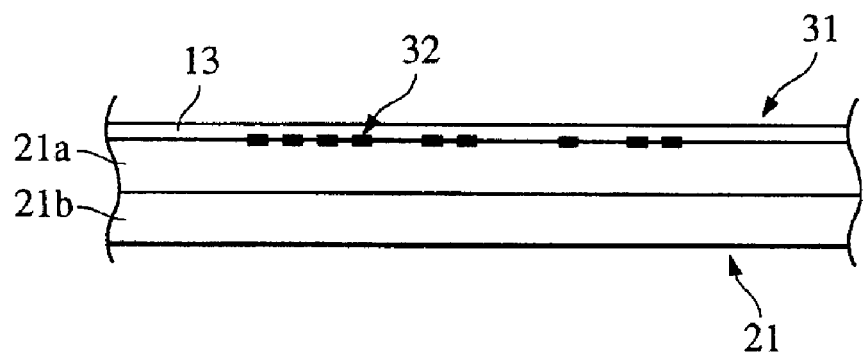
FIG. 7 is a schematic sectional view of a coordinate plate in a second embodiment.
Figure 8:
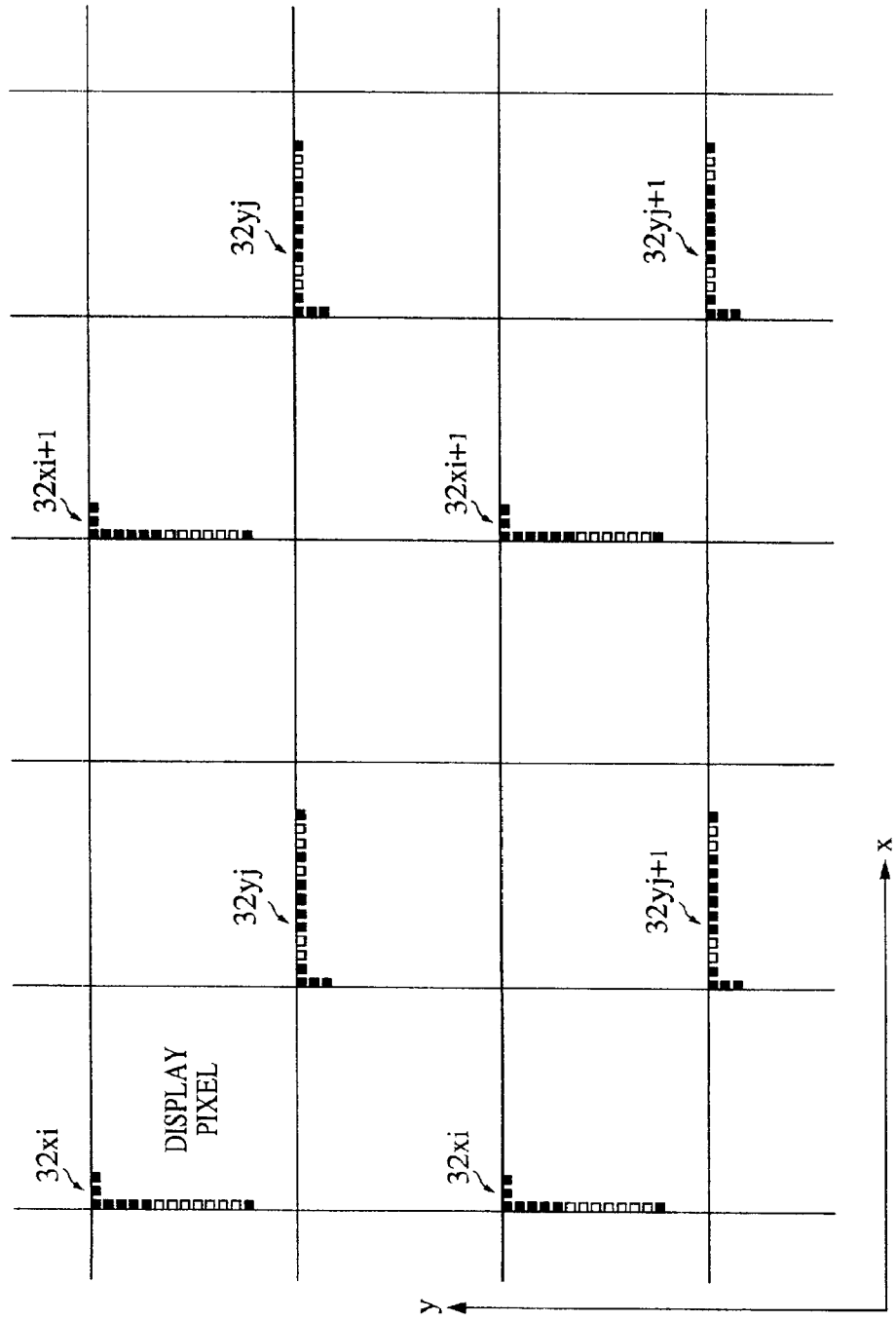
FIG. 8 is a drawing showing a dot array of a coordinate plate used in the second embodiment.

FIG. 7 is a schematic sectional view of a coordinate plate 31 used in the embodiment. According to the embodiment, the coordinate plate 31 also serves as an upper glass plate 21a of the LCD 21. That is, the coordinate plate 31 is formed so that the film 13 is bonded on the top surface of the upper glass plate 21a by using a surface having a dot array 32 formed thereon as the laminating surface. By the structure, because the position of the pen 1 abutting the coordinate plate 31 and the position of the display images of the LCD 21 corresponding to the former position are approximately the same in height in the thickness direction, when an operator views the pen point obliquely, parallax between the pen point and the display images is extremely reduced, enabling more comfortable operation to be performed.

Next, the dot array 32 will be described. FIG. 8 shows an exploded view of an extremely small part of the input effective region. A region defined by fine lines arranged in parallel crosses corresponds to one display pixel of the LCD 21. The dot array 32Xi and 32xi+1 having X-coordinate values of the input effective region coded thereon is arranged at 3 pixels pitches in the X-axis direction and at 2 pixels pitches in the Y-axis direction while the dot array 32Yj and 32Yj+1 having Y-coordinate values coded thereon is arranged spaced from the dot array having an X-coordinate value by one display pitch in both X- and Y-axes directions. Likewise, over the entire input effective region, the dot array 32Xl and 32Xm having X-coordinate values coded thereon and the dot array 32Yl and 32Yn having Y-coordinate values coded thereon are alternately arranged, of course.

Furthermore, the dot array 32 is matched to the boundary between the display pixels of the LCD 21. That is, the corner of an L-shape (will be described later) of the dot array 32 is located at one of four-corners of the display pixel and longitudinal and shorter lines of the L-shape are respectively arranged in parallel with X- and Y-axes. In the boundary, a black matrix is usually formed in order to improve contrast of the display images. Forming the dot array 32 in the boundary almost eliminates the effect of the dot array 32 on the display images. The color of the dot array 32 is not necessary to be limited to specific one. However, when a background is the black matrix, a bright color is preferable in order to obtain more contrast between the dot and the background.

The dot array 32 is L-shaped and has 15 dots including 3 dots in the shorter line and 12 dots in the longitudinal line (one dot in the longitudinal line at the intersection with the shorter line is eliminated). The dot array 32Xi and 32Xi+1 having X-coordinate values coded thereon and the dot array 32Yj and 32Yj+1 having Y-coordinate values coded thereon are mirror images of each other about the longitudinal or the shorter line. Also, the dot array 32Xi and 32Xi+1 having X-coordinate values coded thereon and the dot array 32Yj and 32Yj+1 having Y-coordinate values coded thereon are formed to have an arrangement in which one of them is rotated by 90°.

In the 15 dots, 5 dots in total including 3 dots in the shorter line and 2 dots in the longitudinal line are used for determining the direction of the X- or Y-axis, and the X- or Y-coordinate value. Any of these 5 dots is formed in "1".

That is, when viewing the longitudinal line of the L-shaped dot array 32 arranged in parallel with the Y-axis so that the shorter line is located in the upper, if the longitudinal line is located in the left of the shorter line, the dot array represents the X-coordinate value while it represents the Y-coordinate value if the longitudinal line is located in the right of the shorter line. Also, the direction of the X- or Y-axis can be uniquely determined, that is, when the L-shaped dot array 32 is the X-coordinate value, for example, the shorter line direction from the intersection of the L-shape is the positive X-axis direction while the longitudinal line direction is the negative Y-axis direction. Then, by the 10 dots in the longitudinal line, the X- or Y-coordinate value is coded. In the embodiment, from the existence of the 10 dots, coordinate values of 1024 different combinations can be represented. The region, which is to be read by the area sensor 2 of the pen 1, of the coordinate plate 31 having the dot array 32 formed thereon is formed to certainly include at least one of the dot array 32 representing the X- and Y-coordinate values. In the arrangement described above, although depending on the length of the longitudinal line of the L-shaped dot array 32, the region mentioned above has an area larger than that of 4×3 pixels in the X-×Y-axis of the LCD 21, for example. In the embodiment, the region to be read by the area sensor 2 is to be equivalent to 4.5×3.5 display pixels of the LCD 21.

In the structure, the operation will be described by being aided by the flow-chart in FIG. 4 of the first embodiment.

First, in Step 101, ON/OFF of the pen-point switch is determined. When the pen-point switch is ON, the area sensor 3 reads images of a region including plural numbers of the dot array 32 in the vicinity of the pen point in Step 102. The read images are output by the area sensor 2 to the signal processing circuit 6 where the binarization is performed every one pixel so as to be stored as digital image information in the RAM in the computation control circuit 7.

Next, in Step 103, for the image information stored in the computation control circuit 7, the extraction processing of a first dot array 32 disposed close to the center of the images is performed. The extraction processing is firstly performed by searching 3 dots on the shorter line of the L-shaped dot array 32. The searching is carried out by alternately scanning and searching the dots from the central axis of the image information toward both ends, for example. Upon the completion of searching the 3 dots, because the searched 3 dots are not necessarily the 3 dots on the shorter line of the L-shape, i.e., they may be 3 dots on the longitudinal line sequentially formed thereon, the existence of a dot disposed on the elongated line connecting the searched 3 dots within a predetermined distance is identified so as to determine whether the searched 3 dots are on the shorter line or on the longitudinal line. The predetermined distance is set to have a length equivalent to the longitudinal line of the L-shape from both ends of the searched 3 dots, for example. That is, when the searched 3 dots are located on the longitudinal line, the remaining sequential 2 dots are also detected. Then, after searching 3 dots on the shorter line, a region on both sides of the line connecting the 3 dots in directions perpendicular to the connecting line and having a length longer by a predetermined length than that of the longitudinal line of the L-shape is scanned so as to extract the first dot array 32.

Next, in Step 104, from the shape of the first dot array 32, the first dot array 32 is determined whether the coordinate information having an X-coordinate value coded thereon or the coordinate information having a Y-coordinate value coded thereon. The determination is performed by identifying whether the longitudinal line is located in the left or the right of the shorter line, when viewing the L-shaped dot array 32 arranged so that the shorter line is located in the upper. Then, by the direction of the shorter line of the dot array 32, the directions of the X- and Y-axes are determined, which are set in advance on the coordinate plate 11 in the recorded image information. Then, from the code arrangement of the 10 dots on the longitudinal line of the first dot array 32, a coded coordinate value of the X- or Y-axis is determined.

Next, in Step 105, from the position of the first dot array 32 in the image information and the positive directions of X- and Y-axes, a position in the image information of a second dot array 32 to be extracted is estimated so as to extract it. In the estimation and extraction, for example, there are 4 pieces in total of the coordinate information of the Y-coordinate values approaching the coordinate information of the X-coordinate values including 2 pieces in the ±45° directions of the X-positive-axis spaced by a diagonal line of one display pixel and 2 pieces in the ±60° directions of the X-negative-axis spaced by the distances of diagonal lines of 2 display pixels. Therefore, from the position of the first dot array 32 in the image information, the directions of X- and Y-axes, and the position of the image information center, the dot array 32 in the 4 pieces included in image information and closer to the center is estimated to be the second dot array 32 to be extracted, and the position thereof is estimated so as to extract it.

Then, in Step 106, from the code arrangement of 10 dots on the longitudinal line of the extracted second dot array 32, the coded coordinate value having an axis different from the first dot array 32 is determined.

Next, in Step 107, the distance between the center of image information and each coordinate axis of the first dot array 32 and the second dot array 32 is calculated.

Then, in Step 108, from the coordinate values of the first dot array 32 and the second dot array 32 and the distance between the center of image information and each coordinate axis of the first dot array 32 and the second dot array 32, the precise positional coordinate of the pen 1 can be calculated.

Next, in Step 109, the calculated X- and Y-coordinate values are sent to the transmitting means 8 from the computation control circuit 7, which in turn are input in the CPU 23 via the receiving means 24.

As shown in the structure and operation described above, also in the embodiment, because the dot array 32 is formed not on the top surface of the film 13 but on the laminating surface, even when the pen 1 is abutted, pressed, or rubbed against the coordinate plate 31 by an operator during the indicating or scanning input the surface of the coordinate plate 31, the pen 1 cannot touch the dot array 32 directly, so that damages, deformation, wearing out, paling, discoloring, and dropping off cannot occur in the dot array 32, enabling the dot array 32 to be maintained forever with high reliability. Also, in the manufacturing process of the coordinate plate 31, once the film 13 is bonded on the upper glass plate 21a of the display panel of the LCD 21, the handling is enabled to be easy without specific caution or jigs.

In the embodiment, in the boundary, which comprises a black matrix, between the display pixels of the LCD 21, the dot array 32, which is the coded coordinate information of the X- or Y-coordinate value, is formed, so that even when the apparatus is formed as an input-output integrated type by laying the coordinate plate 31 on the LCD 21 together, the dot array 32 that is coordinate information recorded on the coordinate plate 31 scarcely has any influence on the display images.

As described above, according to the embodiment, on the same basis as of the first embodiment, an extremely reliable coordinate input-output apparatus with excellent operability can be provided at low cost.

Modifications of Embodiments

In the embodiments described above, X- and Y-coordinate values are independently formed as coordinate information; however, the present invention is not limited to this structure. That is, one of the messages of the present invention is that by forming coordinate information between layers of a coordinate plate formed of plural layers, the coordinate information can be maintained semi-permanently with extremely high reliability at low cost, and the structure of the coordinate information is not limited. For example, one piece of the coordinate information may include coded X- and Y-coordinate values. In this structure, the coordinate information may be formed in a matrix arrangement wherein the X-coordinate value may be formed in upper rows and the Y-coordinate value in lower rows. Any techniques may be of course employed for including coded X- and Y-coordinate values in one piece of the coordinate information.

Figure 9:
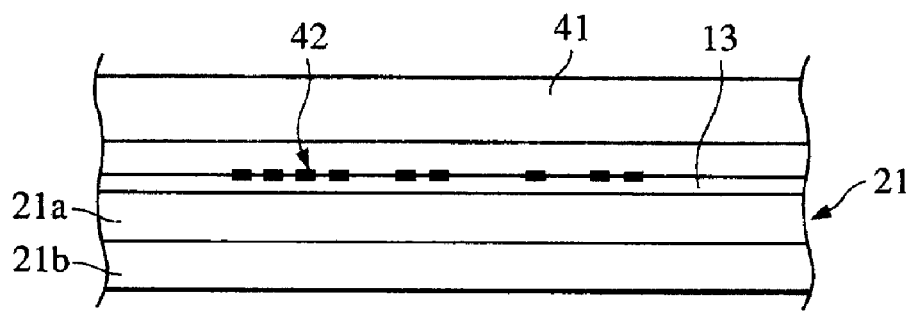
FIG. 9 is a schematic sectional view of a coordinate plate in a modified embodiment.

The coordinate plate according to the present invention is not limited to the structure of a glass plate having a film bonded on the surface thereof. For example, various transparent plastic plates such as an acrylic plate may be used instead of the glass plate. Also, structures may be employed in which a film is bonded on the back surface of the coordinate plate wherein the coordinate information is formed on the laminating surface; films are bonded on both surfaces of the coordinate plate wherein the coordinate information is formed on any of laminating surfaces. Also, not one film but plural films may be bonded; in this case, the coordinate information may be formed on any of laminating surfaces. When a film forming a coordinate plate is bonded on the surface of displaying means wherein the coordinate information is recorded on the laminating surface of the film (the second embodiment), in order to prevent a bad influence on the displaying means by inputting operation such as damaged and disturbed display, a transparent plastic plate 41 for inputting may be arranged on the front surface of the displaying means (see FIG. 9). These structures may be selected according to optical performances required to the coordinate plate such as a light-transmission coefficient and a reflection coefficient, and mechanical functions such as an apparatus structure, strength, weight, productivity, and safety. In any of structures, in operation by an operator and handling in the manufacturing process, damages, deformation, wearing out, paling, discoloring, and dropping off cannot occur in coordinate information, enabling the coordinate information to be maintained forever with high reliability.

According to the present invention, a coordinate input apparatus is not necessarily integrated with displaying means. For example, it may be used as an input apparatus on a desk separated from the displaying means. In this case, a transparent film is bonded on the top surface, the back surface, or both surfaces of the coordinate plate, wherein coordinate information is formed on any of laminating surfaces. By the structure, damages, deformation, wearing out, paling, discoloring, and dropping off cannot occur in the coordinate information due to abutment, pressing, rubbing with the pen or a hand on the top surface of the coordinate plate, or contact, pressing, or friction with the desk surface or various articles on the desk on the back surface of the coordinate plate, so that the image information can be maintained forever with extremely high reliability.

The coordinate plate is not limited to a transparent material. That is, when the coordinate input apparatus is not integrated with displaying means for being used as a single unit, as mentioned above, transparency is not required, and any materials such as various metals and various plastics may be used as far as desired coordinate information can be formed thereon.

A coding technique for coordinate information is not limited to the dot array according to the embodiment; any techniques can be employed as far as the coordinate information can be coded; for example, coding by continuous dots without gaps, i.e., by the length of a linear pattern, and coding by bar codes, i.e., by the width and space of two kinds of bars.

In the coding by the dot array, any numbers of dots may be used according to the required specification, i.e., the area of an input effective region, fineness of display images, accuracies or resolving power of coordinate inputting, and the specification of the area sensor as indicating input means. The dot array may be added by the size, shape, and color of dots, on demand. In the coding, "0" is not necessarily the same as the background as far as dots of "0" and "1" having respective colors can be determined and binarized. For example, although the dots of "0" and "1" have the same color, the dots can be coded as far as they have different contrasts. The space between dots is not limited to the same as the dot size just like in the embodiment, and any space in size may be applied. A larger space is preferable within the allowable limit. By employing a so-called DC free dot array in which the number of "1" dots are substantially the same in the entire dot array, the so-called gray grade may be unified. Furthermore, the so-called zero-run in which dots of "1" or "0" are continuously arranged may be prohibited. The unified gray grade and the zero-run prohibition enable the display images to be uniformly viewed as a whole.

The searching and extracting of coordinate information are not limited to the embodiments; however, desired features from the binarized coordinate information and various techniques for searching and extracting regions may be applied to the present invention. Any structures may be applied such as spiral searching and extraction from the vicinity of image information center or searching and extraction of desired regions after reduced number scanning within a predetermined range.

Means for determining coordinate information is whether a coded X-coordinate value or a coded Y-coordinate value is not limited to the embodiments described above; any techniques may be applied to the present invention as far as the coordinate information can be coded. For example, a shape such as a dot matrix, a structure such as a dot matrix, a dot size, and a dot shape or a dot color may be employed for the determination.

The searching, extraction, and determination of coordinate information may of course include various checking functions such as confirmation of X- and Y-coordinate values, reference of adjacent coordinate information, or reference of sampling data earlier by one piece and the function for detecting errors by parity check added by parity bits.

The arrangement pitch of coordinate information arranged intermittently may be determined arbitrarily as far as the coordinate information recorded on the coordinate plate can extremely reduce any influence on the display images even the coordinate input apparatus is integrated with a display apparatus as an input-output type, which is one feature of the present invention. Preferably, between coordinate information, the arrangement pitch may have a gap larger than the area dominated by the coordinate information. The arrangement pitch may be different between X- and Y-axes just like in the second embodiment. Also, the pitch is not necessarily the same over the entire input effective region. This is effective when the apparatus is for use in a system such as a personal computer and a specific terminal, in which using frequency differs depending on a position in the input effective region.

The arrangement pitch is not necessarily related to the display pixel pitch of displaying means, especially when a coordinate plate having a gap to the displaying means in the thickness direction just like in the first embodiment.

When the coordinate information is arranged to relate to the display pixel pitch of displaying means, the arrangement is not limited to the embodiments. For example, when the displaying means is capable of color display, the coordinate information may form to be related to any pixel in pixels of R (red), G (green), and B (blue) as far as the object of the present invention is achieved.

The structure of input indicating means is not limited to the embodiments. In the embodiments, the input indicating means is a pen structure; however, it may be any shape such as a mouse type.

In the light-emitting element, plural elements may be used on demand. The light-emitting element is not necessarily required especially when the area sensor functions utilizing ambient lighting in which the coordinate input apparatus according to the present invention is used such as room lighting or utilizing light emitted by the display image itself.

The objective lens may have any structure as far as the image of coordinate information is formed on the area sensor in the desired brightness, magnification, resolution, picture angle, distortion, and depth field.

To the kind, image size, and number of pixels of the area sensor and the area sensor internal structure such as various peripheral circuits having an A/D converter, a timing IC for driving the sensor, and an automatic gain control circuit built therein, the present invention is not limited.

The position of coordinate information formed therein is not limited to the film-laminating surface in the embodiments, of course. It may be the top or bottom surface of the coordinate plate. In the case of the multilayer coordinate plate having three or more layers, any interlaminar surface may be utilized. When a film forming a coordinate plate is bonded on the surface of displaying means and coordinate information is recorded on the surface of the film, a transparent plastic plate 41 for inputting may be arranged on the front surface of the displaying means in order to prevent bad influences by input operation on the displaying means such as damages and display disturbances (see FIG. 9). That is, any position of coordinate information formed therein may be employed as far as the information can be detected by the input indicating means.

The signal processing circuit and the computation control circuit for detecting coordinate information, distinguishing between X- and Y-coordinate values, and for determining the coordinate value are not necessarily embedded in the input indicating means. That is, the signal processing circuit and the computation control circuit may be arranged in the apparatus body depending on the configuration of the input indicating means, specification of a battery built in the input indicating means, or specification for communicating between the input indicating means and the body in which the CPU is arranged. In this case, the information being communicated between the outputting means of the input indicating means and the receiving means in the body certainly has various configurations. Also, without the inputting means and the receiving means in the embodiments, the input indicating means and the body may be connected with a predetermined connecting code. In this case, the power may be supplied with the connecting code without the battery arranged in the input indicating means, of course.

The display means is not limited to the LCD according to the embodiments and any kind or type of display means and any size of display images may be applied to the present invention.

The coordinate plate is not limited to a transparent material. That is, when the coordinate input apparatus according to the present invention is not integrated with the display means to be used as a single unit, the material of the coordinate plate is unnecessary to be transparent so that any material may be used such as various metals and plastics so far as it can form desired coordinate information thereon.

As described above, according to the present invention, a coordinate input apparatus and a coordinate input-output apparatus with high reliability and excellent operability are provided at low cost.

The miss-detection or non-detectability caused by damage, deformation, wearing out, paling, discoloring, and dropping off of the coordinate information recorded on the coordinate plate can also be avoided so as to achieve a reliable apparatus at low cost.

In more detail, because information included in the coordinate information is not a pair of X- and Y-coordinate values but any one of them, the information amount in one piece of coordinate information can be halved. Furthermore, by recording intermittently, the number of pieces of coordinate information can be extremely reduced, so that even when the coordinate input apparatus is integrated with the display apparatus as an input-output type, influence on display images by coordinate information recorded on the coordinate plate can be extremely reduced, thereby improving operability.

When the coordinate information comprises dot array, and at least a part of the arrangement of the dot array corresponding to the X-coordinate value is different from that of the dot array corresponding to the Y-coordinate value, the amount of the coordinate information does not require to be increased in order to determine between X- and Y-coordinate values, so that any influence on display images by coordinate information recorded on the coordinate plate can be extremely reduced, thereby improving operability.

When the dot array of the coordinate information has a dot-matrix arrangement with plural rows and plural columns, or has an L-shaped arrangement, even when the input indicating means is oriented in any direction in the coordinate input effective region, the amount of the coordinate information does not have to be increased in order to determine between X- and Y-axis directions and X- and Y-coordinate values, so that influence on display images by coordinate information recorded on the coordinate plate can be extremely reduced, thereby improving operability.

When the dot array of the coordinate information has gaps between dots forming the array, the dots cannot be linked together continuously, eliminating being recognized by an operator, so that the excellent operation of input indication is enabled without being disturbed by the coordinate information.

According to the present invention, the coordinate information recorded on the coordinate plate may be arranged in positions in which influence on display images by coordinate information is not caused to the utmost, so that the influence on display images by coordinate information recorded on the coordinate plate can be extremely reduced.

Also, the coordinate information may be recorded between display pixels of the display apparatus, so that any influence can be further extremely reduced.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A coordinate input apparatus comprising:
   a coordinate plate having a plurality of pieces of coded coordinate information composed of dots, each corresponding to an X-coordinate value, and having a plurality of pieces of coded coordinate information composed of dots, each corresponding to a Y-coordinate value, said plurality of pieces of coded coordinate information being formed at predetermined intervals on said coordinate plate, wherein the intervals between the pieces of coded coordinate information are wider than intervals between the dots in a piece of the coded coordinate information;
   input-indicating means for indicating a position of the coordinate plate to be input and for detecting the coordinate information in the vicinity of the position; and
   processing means for determining X-coordinate values and Y-coordinate values from the coordinate information detected by said input-indicating means and for determining the coordinate of the input position on the basis of the X-coordinate values and Y-coordinate values.

2. An apparatus according to claim 1, wherein the coded coordinate information comprises a dot array, at least one part of said dot array corresponding to X-coordinate values being different from another part of said dot array corresponding to Y-coordinate values.

3. An apparatus according to claim 2, wherein said dot array of the coded coordinate information is formed of a plurality of rows and a plurality of columns.

4. An apparatus according to claim 2, wherein said dot array of the coded coordinate information has an L-shaped arrangement.

5. An apparatus according to any one of claims 2 to 4, wherein said dot array of the coded coordinate information has an arrangement wherein dots are formed with predetermined intervals.

6. An apparatus according to claim 1, further comprising a display apparatus formed as an input-output integrated type.

7. An apparatus according to claim 6, wherein said coordinate plate and said display-apparatus are formed with a space therebetween.

8. An apparatus according to claim 6, wherein said coordinate plate and said display apparatus are disposed close to each other and said coordinate plate also serves as a part of said display apparatus.

9. An apparatus according to claim 6, wherein said plurality of pieces of coded coordinate information are recorded on said coordinate plate so as to be positionally related to a plurality of display pixels forming display images of said display apparatus.

10. An apparatus according to claim 9, wherein the plurality of pieces of coded coordinate information are recorded so as to be located between said plurality of display pixels.

11. A method of inputting a coordinate into a coordinate input apparatus by an input-indicating means for indicating a position to be input, the method comprising the steps of:
    reading image information from a coordinate plate by the input-indicating means, the coordinate plate having a plurality of pieces of coded X-coordinate information composed of dots, and having a plurality of pieces of Y-coordinate information composed of dots, wherein the plurality of pieces of coded X- and Y-coordinate information are formed at predetermined intervals which are wider than intervals between the dots in a piece of the coded coordinate information;
    extracting first coordinate information from the read image information;
    determining coordinate values in the X- or Y-axis in the first coordinate information using the extracted first coordinate information;
    extracting second coordinate information using the read image information;
    determining coordinate values in the X- or Y-axis in the second coordinate information using the extracted second coordinate information;
    determining coordinate values of the input position indicated by the input-indicating means in the X- and Y-axes on the basis of the coordinate values in the first coordinate information and the coordinate values in the second coordinate information; and
    inputting the determined coordinate values of the input position in the X- and Y-axes.

12. A method of inputting a coordinate into a coordinate input apparatus by an input-indicating means for indicating a position to be input, the method comprising the steps of:
    reading image information from a coordinate plate by the input-indicating means, the coordinate plate having a plurality of pieces of coded X-coordinate information composed of dots, and having a plurality of pieces of Y-coordinate information composed of dots, wherein the plurality of pieces of coded X- and Y-coordinate information are formed at predetermined intervals which are wider than intervals between the dots in a piece of the coded coordinate information;

extracting first coordinate information located in a central region of the image information read;

determining coordinate values in the X- or Y-axis in the first coordinate information from the extracted first coordinate information;

estimating and extracting a position of second coordinate information located in the region of said image information using the extracted first coordinate information;

determining coordinate values in the X- or Y-axis in the second coordinate information using the extracted second coordinate information;

determining coordinate values of the input position indicated by the input-indicating means in the X- and Y-axes on the basis of the determined coordinate values in the first coordinate information and the determined coordinate values in the second coordinate information; and inputting the determined coordinate values of the input position in the X- and Y-axes.

13. A coordinate input apparatus comprising:

a coordinate plate having a plurality of pieces of coded coordinate information composed of dots, each corresponding to an X-coordinate value, and having a plurality of pieces of coded coordinate information composed of dots, each corresponding to a Y-coordinate value, said plurality of pieces of coded coordinate information being formed at predetermined intervals on said coordinate plate in a coordinate input effective region forming an X-Y coordinate plane, wherein the intervals between the pieces of coded coordinate information are wider than intervals between the dots in a piece of the coded coordinate information; and input-indicating means comprising means for detecting the coded coordinate information of said coordinate plate, wherein said coordinate plate has a layered structure comprising a plurality of layers deposited in a thickness direction, the coordinate information being stored between the layers of said layered structure.

14. An apparatus according to claim 13, wherein the coded coordinate information is independently and intermittently recorded on said coordinate plate.

15. A coordinate input-output apparatus comprising:

a coordinate plate having a plurality of pieces of coded coordinate information composed of dots, each corresponding to an X-coordinate value, and having a plurality of pieces of coded coordinate information composed of dots, each corresponding to a Y-coordinate value, said plurality of pieces of coded coordinate information being formed at predetermined intervals on said coordinate plate in a coordinate input effective region forming an X-Y coordinate plane, wherein the intervals between the pieces of coded coordinate information are wider than intervals between the dots in a piece of the coded coordinate information;

input-indicating means comprising means for detecting the coded coordinate information on said coordinate plate, wherein said coordinate plate has a layered structure comprising a plurality of layers deposited in a thickness direction, the coordinate information being stored between the layers of said layered structure; and displaying means disposed so as to oppose said coordinate plate and being capable of displaying two-dimensional images.

16. A coordinate input-output apparatus comprising:

displaying means capable of displaying two-dimensional images;

a coordinate plate having a plurality of pieces of coded coordinate information composed of dots, each corresponding to an X-coordinate value, and having a plurality of pieces of coded coordinate information composed of dots, each corresponding to a Y-coordinate value, said plurality of pieces of coded coordinate information being formed at predetermined intervals on said coordinate plate in a coordinate input effective region forming an X-Y coordinate plane, wherein the intervals between the pieces of coded coordinate information are wider than intervals between the dots in a piece of the coded coordinate information; and input-indicating means comprising means for detecting the coded coordinate information of said coordinate plate, wherein a surface of said coordinate plate having the coded coordinate information recorded thereon opposes and is bonded to a surface of said displaying means.

17. An apparatus according to claim 15 or 16, wherein the coded coordinate information is recorded to be positionally related to a plurality of display pixels forming display images of said displaying means.

18. An apparatus according to claim 17, wherein the coded coordinate information is independently and intermittently recorded on said coordinate plate.

19. A coordinate input-output unit of a coordinate input apparatus comprising:

a coordinate plate having a plurality of pieces of coded coordinate information composed of dots, each corresponding to an X-coordinate value, and having a plurality of pieces of coded coordinate information composed of dots, each corresponding to a Y-coordinate value, said plurality of pieces of coded coordinate information being formed at predetermined intervals on said coordinate plate, wherein the intervals between the pieces of coded coordinate information are wider than intervals between the dots in a piece of the coded coordinate information; and a display apparatus integrated with said coordinate plate together, wherein the coordinate information is recorded on said coordinate plate so as to be positionaily related to a plurality of display pixels forming display images of said display apparatus.

20. A unit according to claim 19, wherein the coded coordinate information is recorded so as to be located between the display pixels.

21. A coordinate plate of a coordinate input apparatus comprising:

a plurality of pieces of coded coordinate information composed of dots, each corresponding to an X-coordinate value; and a plurality of pieces of coded coordinate information composed of dots, each corresponding to a Y-coordinate value, said plurality of pieces of coded coordinate information being formed at predetermined intervals on said coordinate plate, wherein the intervals between the pieces of coded coordinate information are wider than intervals between the dots in a piece of the coded coordinate information.

22. A coordinate plate according to claim 21, further comprising a display apparatus which is integrated with said coordinate plate, wherein the plurality of pieces of coded coordinate information are recorded on said coordinate plate so as to be positionally related to a plurality of display pixels forming display images of said display apparatus.

23. A coordinate plate according to claim 22, wherein the coded coordinate information is recorded so as to be located between said display pixels.

24. A coordinate plate according to claim 21, wherein the coded coordinate information comprises a dot array, and at least one part of said dot array corresponding to X-coordinate values is different from another part of said dot array corresponding to Y-coordinate values.

* * * * *

UNITED STATES PATENT AND TRADEMARK OFFICE
CERTIFICATE OF CORRECTION

PATENT NO. : 6,965,377 B2
APPLICATION NO. : 09/973838
DATED : November 15, 2005
INVENTOR(S) : Ryozo Yanagisawa et al.

Page 1 of 1

It is certified that error appears in the above-identified patent and that said Letters Patent is hereby corrected as shown below:

COLUMN 10:
    Line 45, "regardless" should read --regardless of--.

COLUMN 12:
    Line 47, "set adjust" should read --set--.

COLUMN 14:
    Line 46, "32xi+1" should read --32Xi+1--.

COLUMN 16:
    Line 19, "having" should read --has--.
    Line 20, "having" should read --has--.

Signed and Sealed this

Ninth Day of January, 2007

JON W. DUDAS
*Director of the United States Patent and Trademark Office*